United States Patent [19]
Ishikawa et al.

[11] Patent Number: 5,042,627
[45] Date of Patent: Aug. 27, 1991

[54] ELECTRIC CONTROL APPARATUS FOR CLUTCH MECHANISM

[75] Inventors: Takumi Ishikawa; Nobuyasu Suzumura; Masahiko Noba, all of Toyota; Toshikazu Koide, Toyokawa, all of Japan

[73] Assignee: Aisin Seiki K.K., Aichi, Japan

[21] Appl. No.: 594,487

[22] Filed: Oct. 9, 1990

[30] Foreign Application Priority Data

Oct. 9, 1989 [JP] Japan ................... 1-263272

[51] Int. Cl.⁵ ...................... B60K 23/08; F16D 27/16
[52] U.S. Cl. ...................... 192/40; 192/84 R
[58] Field of Search ............ 192/0.02 R, 40, 50, 192/84 R; 180/233, 247; 318/280, 281

[56] References Cited

U.S. PATENT DOCUMENTS

| | | | |
|---|---|---|---|
| 4,776,441 | 10/1988 | Kagata et al. | 192/84 R X |
| 4,899,856 | 2/1990 | Kurihara | 192/84 R X |
| 4,928,804 | 5/1990 | Wakabayashi | 192/84 R X |
| 4,991,680 | 2/1991 | Shiba et al. | 192/40 X |

FOREIGN PATENT DOCUMENTS

| | | | |
|---|---|---|---|
| 63-188231 | 12/1988 | Japan . | |
| 64-78929 | 3/1989 | Japan | 180/247 |
| 1-90823 | 4/1989 | Japan | 180/247 |
| WO84/03071 | 8/1984 | World Int. Prop. O. | 192/84 R |

Primary Examiner—Richard Lorence
Attorney, Agent, or Firm—Sughrue, Mion, Zinn, Macpeak & Seas

[57] ABSTRACT

In an electric control apparatus for a clutch mechanism provided therein with a reversible electric motor which is activated under control of a changeover switch to engage the clutch mechanism in its forward rotation and to disengage the clutch mechanism in its reverse rotation, a first period of time is set when the changeover switch has been operated to engage the clutch mechanism, and a second period of time is set when the changeover switch has been operated to disengage the clutch mechanism. The first period of time represents a power supply time during which the electric motor is activated to cause full engagement of the clutch mechanism. The second period of time is defined to be longer than the first period of time and represents a power supply time during which the electric motor is activated to cause full disengagement of the clutch mechanism.

2 Claims, 5 Drawing Sheets

ELECTRIC CONTROL APPARATUS FOR CLUTCH MECHANISM

BACKGROUND OF THE INVENTION

1. Field of the Invention

The present invention relates to an electric control apparatus for a clutch mechanism such as a wheel hub clutch mechanism which is arranged to be engaged or disengaged by activation of a reversible electric motor assembled therein.

2. Description of the Prior Art

In Japanese Utility Model Early Publication No. 63-188231, there is disclosed a clutch mechanism provided therein with a reversible electric motor which is activated under control of a changeover switch to engage the clutch mechanism in its forward rotation and to disengage the clutch mechanism in its reverse rotation. In the case that the electric motor is activated for a predetermined period of time to engage or disengage the clutch mechanism, the following problem will be raised. When the clutch mechanism is switched over from an engaged condition to a disengaged condition, the motive power of the electric motor must be increased to disengage one of the clutch members from the other clutch member against a frictional load acting thereon. If the period of time for activation of the electric motor was determined to be a short period of time suitable for engagement of the clutch mechanism, reliable disengagement of the clutch members would not be effected. If the period of time for activation of the electric motor was determined to be a long period of time suitable for disengagement of the clutch mechanism, the electric power would be wasted due to unnecessary activation of the electric motor.

SUMMARY OF THE INVENTION

It is, therefore, a primary object of the present invention to provide an electric control apparatus for the clutch mechanism capable of activating the electric motor for an optimal period of time respectively suitable for engagement and disengagement of the clutch mechanism.

A secondary object of the present invention is to provide an electric control apparatus for the clutch mechanism capable of controlling the activation time of the electric motor in accordance with fluctuation of the power source voltage.

According to the present invention, the primary object is attained by providing an electric control apparatus for a clutch mechanism provided therein with a reversible electric motor which is activated under control of a changeover switch to engage the clutch mechanism in its forward rotation and to disengage the clutch mechanism in its reverse rotation, which control apparatus comprises means for setting a first period of time when the changeover switch has been operated to engage the clutch mechanism, the first period of time representing a power supply time during which the electric motor is activated to cause full engagement of the clutch mechanism, means for setting a second period of time when the changeover switch has been operated to disengage the clutch mechanism, the second period of time being defined to be longer than the first period of time and representing a power supply time during which the electric motor is activated to cause full disengagement of the clutch mechanism.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENT

Figure 1:
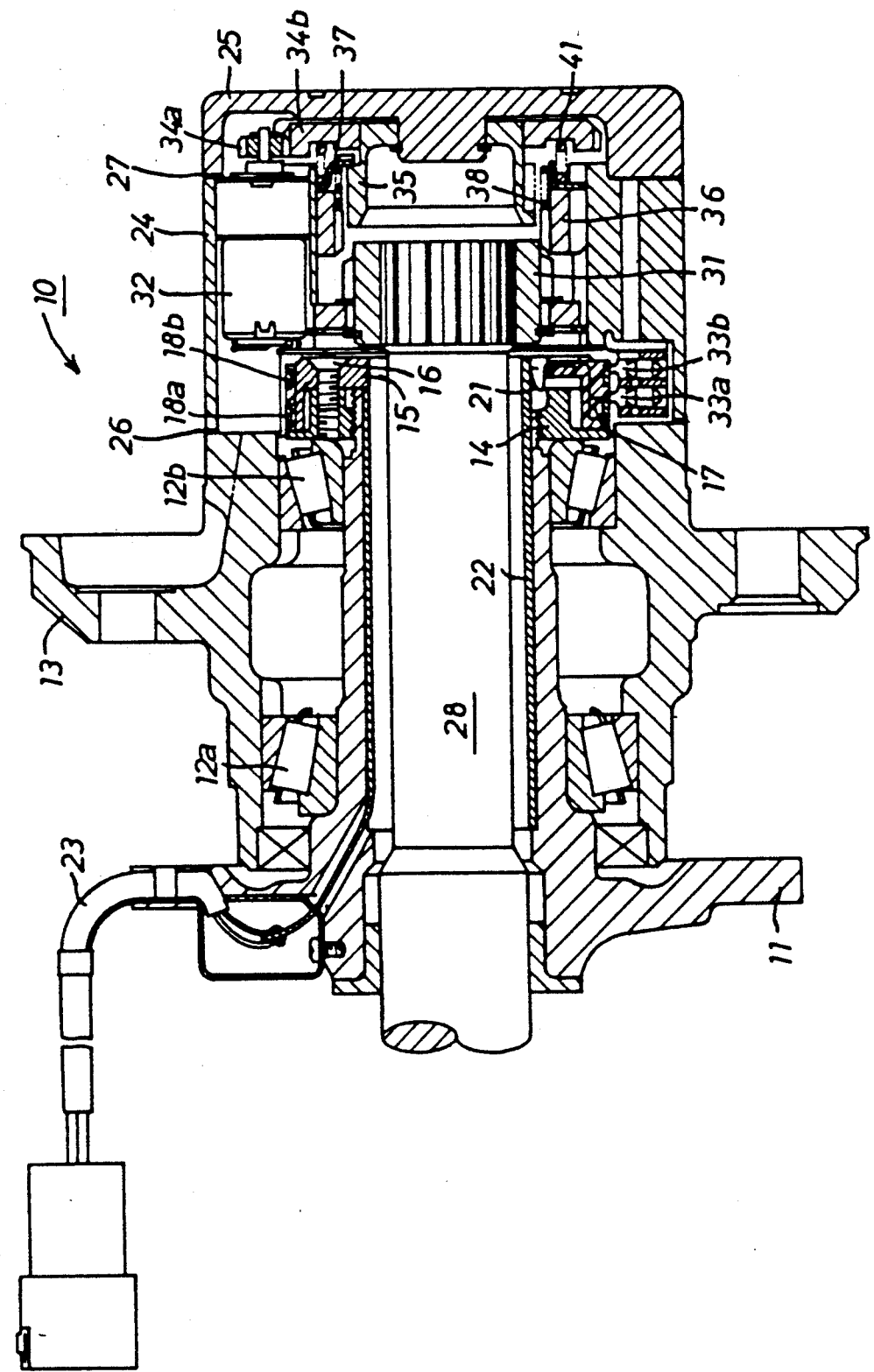
FIG. 1 is a sectional view of a wheel hub clutch mechanism adapted for use in a four-wheel drive vehicle.

In FIG. 1 of the drawings, there is illustrated a wheel hub clutch mechanism 10 adapted for use in a four-wheel drive vehicle. The wheel hub clutch mechanism 10 is mounted to a wheel hub 13 which is rotatably supported on a stationary axle tube 11 through a pair of axially spaced bearings 12*a*, 12*b*. The bearing 12*b* is positioned in place on the outer end of axle tube 11 by means of a lock nut 14. An annular holder 15 is engaged with the outer end of axle tube 11 and fixed to the lock nut 14 by means of bolts 16. A pair of axially spaced slip rings 18*a*, 18*b* are coupled over the annular holder 15 through an annular insulation member 17 and connected to a lead wire 23 through a spring contact 21 and a tubular flexible printed-circuit board 22.

The wheel hub clutch mechanism 10 includes a cylindrical body 24 coupled with the outer end of wheel hub 13 through an annular gasket 26 and fastened in place by means of circumferentially spaced bolts (not shown) threaded therethrough into wheel hub 13. The cylindrical body 24 is closed by a cover member 25 secured thereto through an annular gasket 27 and contains therein an inner clutch member 31 which is mounted on the outer end of a drive axle 28 for rotation therewith. Assembled within a peripheral wall of cylindrical body 24 is an electric motor 32 which is electrically connected to the slip rings 18*a*, 18*b* through brushes 33*a*, 33*b*. The electric motor 32 is in the form of a reversible direct current motor drivingly connected to a cam rotor 35 through reduction gears 34*a*, 34*b* to rotate the cam rotor 35 in a forward or reverse direction. The cam rotor 35 is engaged with an annular cam follower 37 which is maintained in engagement with an outer clutch member 36 under load of a compression coil spring 41 and connected with the outer clutch member 36 by means of a tension coil spring 38. The outer clutch member 36 is axially slidably coupled at its externally splined portion with an internally splined portion of cylindrical body 24 to be brought into engagement with the inner clutch member 31.

When the electric motor 32 is activated to rotate the cam rotor 35 in the forward direction, the cam follower 37 cooperates with the cam rotor 35 to bring the outer clutch member 36 into engagement with the inner clutch member 31 for establishing a drive connection between the drive axle 28 and the wheel hub 13. When the electric motor 32 is activated to rotate the cam rotor 35 in the reverse direction, the cam follower 37 cooperates with the cam rotor 35 to disengage the outer clutch member 36 from the inner clutch member 31 for permitting free rotation of the wheel hub 13 about the axle tube 11.

Figure 2:
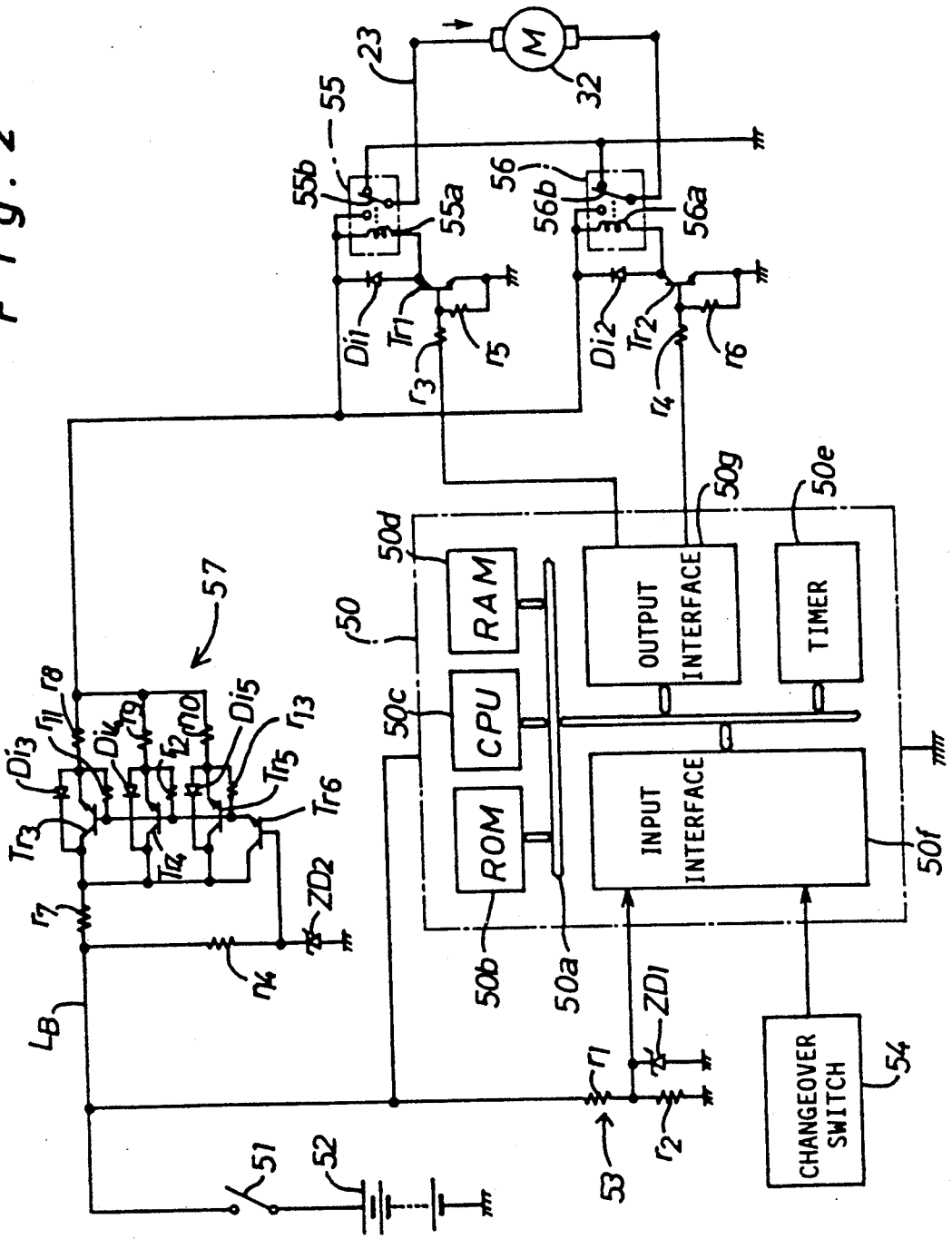
FIG. 2 is a diagram of an electric control apparatus for the wheel hub clutch mechanism shown in FIG. 1.

As shown in FIG. 2, an electric control apparatus for the wheel hub clutch mechanism 10 includes a microcomputer 50 connected to a power source line $L_B$ and grounded. The computer 50 has a read-only memory or ROM 50b, a central processing unit or CPU 50c, a random-access memory or RAM 50d, a timer circuit 50e, an input interface 50f and an output interface 50g which are connected to a common bus line 50a. The power source line $L_B$ is connected to a vehicle battery 52 through an ignition switch 51 of the vehicle. ROM 50b is arranged to memorize main and interruption programs illustrated by flow charts in FIGS. 3(a), 3(b) and 4. CPU 50c is arranged to execute the main program when the ignition switch 51 is closed and to execute the interruption program when applied with an interruption signal from the timer circuit 50e. RAM 50d is arranged to temporarily memorize variables necessary for execution of the main program. The timer circuit 50e includes an oscillator which produces an interruption signal therefrom at a predetermined time interval of, for instance, 0.5 ms.

The input interface 50f includes an input circuit, an analog to digital converter and a memory circuit. The input interface 50f is connected to a voltage detection circuit 53 and a changeover switch 54. The voltage detection circuit 53 is composed of resistors $r_1$, $r_2$ connected in series between the power source line $L_B$ and the ground and a zener diode $ZD_1$ connected in parallel with the resistor $r_2$. Thus, the input interface 50f is arranged to be applied with a voltage divided by resistors $r_1$ and $r_2$. The changeover switch 54 is located in a position adjacent the driver's seat to be operated by the driver. The changeover switch 54 is of a normally open type to be maintained in a open position when the wheel hub clutch mechanism 10 is in a disengaged condition and to be closed when it is desired to engage the clutch mechanism 10.

The output interface 50g includes a memory circuit and an output circuit Switching transistors $Tr_1$ and $Tr_2$ are connected at their bases to the output interface 50g through resistors $r_3$, $r_4$ to control rotation of the electric motor 32. The transistors $Tr_1$, $Tr_2$ are grounded at their emitters and connected further at their emitters to their bases through resistors $r_5$, $r_6$, respectively. The transistors $Tr_1$, $Tr_2$ are connected at their collectors to each one end of coils 55a, 56a of relay circuits 55, 56. The relay coils 55a, 56a are connected in parallel with flywheel diodes $Di_1$, $Di_2$ and connected at their other ends to a step-down circuit 57 which is provided to step down the source voltage of battery 52 to a constant voltage suitable for activating the electric motor 32.

The step-down circuit 57 includes power transistors $Tr_3$ to $Tr_5$ connected in parallel to one another and connected at their collectors to the power source line $L_B$ through a resistor $r_7$. The power transistors $Tr_3$ to $Tr_5$ are connected at their emitters to the relay circuits 55, 56 through resistors $r_8$ to $r_{10}$ and connected at their emitters to their collectors through diodes $Di_3$ to $Di_5$. The power transistors $Tr_3$ to $Tr_5$ are further connected at their emitters to their bases through resistors $r_{11}$ to $r_{13}$, respectively. A transistor $Tr_6$ is connected at its emitter to the bases of transistors $Tr_3$ to $Tr_5$ and at its collector to the collectors of transistors $Tr_3$ to $Tr_5$. The transistor $Tr_6$ is applied at its base with a constant voltage defined by a resistor $r_{14}$ and a zener diode $ZD_2$ connected in series between the power source line $L_B$ and the ground. The relay circuits 55, 56 include switches 55b, 56b which are switched over by energization of the relay coils 55a, 56a. During deenergization of the relay coils 55a, 56a, the switches 55b, 56b each are retained in a first position as shown in the figure to maintain the electric motor 32 in its deactivated condition. When the relay coils 55a, 56a are selectively energized, the switches 55b, 56b each are switched over to a second position to apply an output voltage of step-down circuit 57 to the electric motor 32.

Hereinafter, the operation of the electric control apparatus will be described in detail with reference to FIGS. 3(a), 3(b) and 4.

INITIAL CONTROL

Figure 3A:
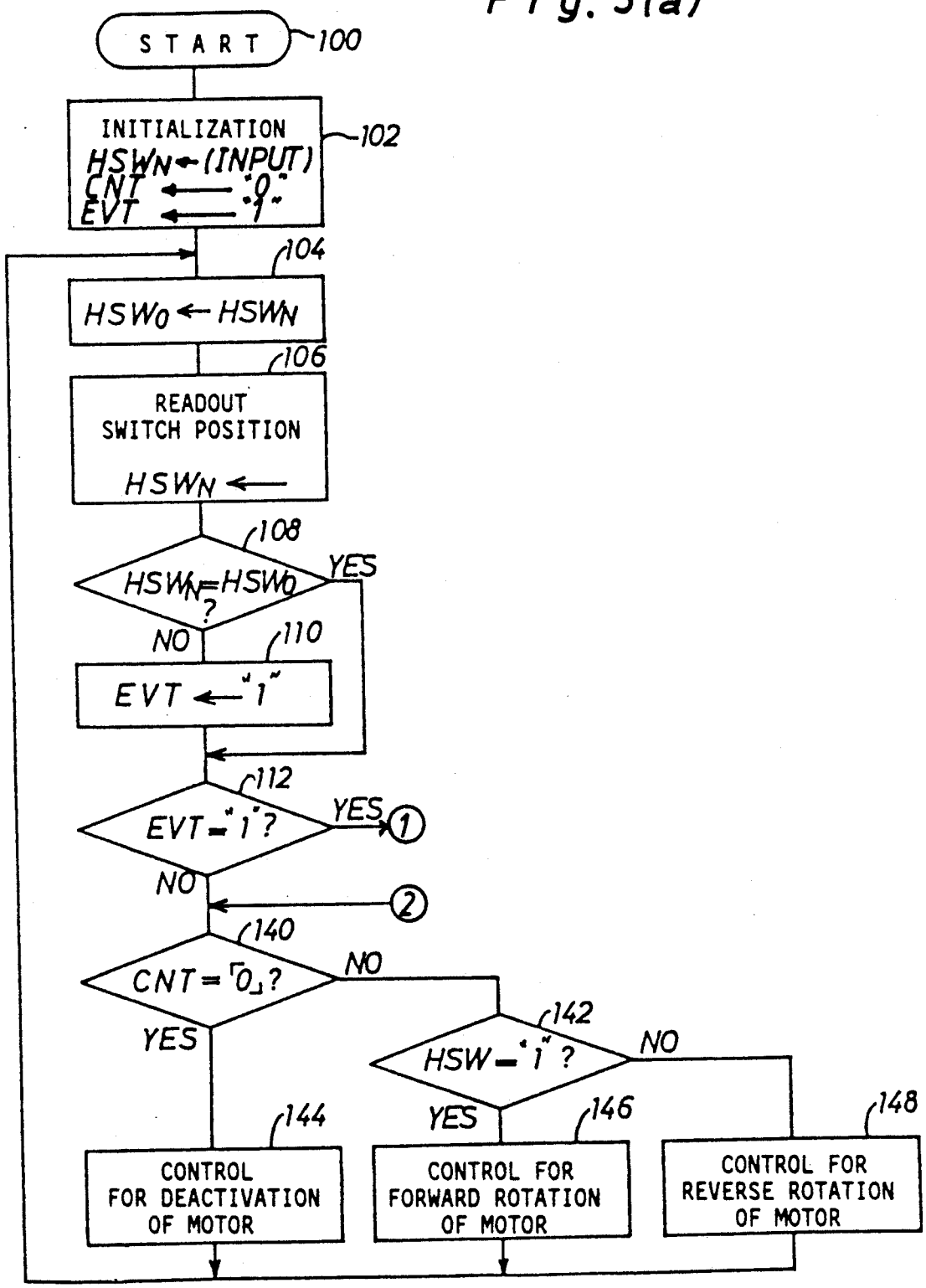
FIGS. 3(*a*) and 3(*b*) illustrate a flow chart of a main program by a microcomputer shown in FIG. 2.
Figure 3B:
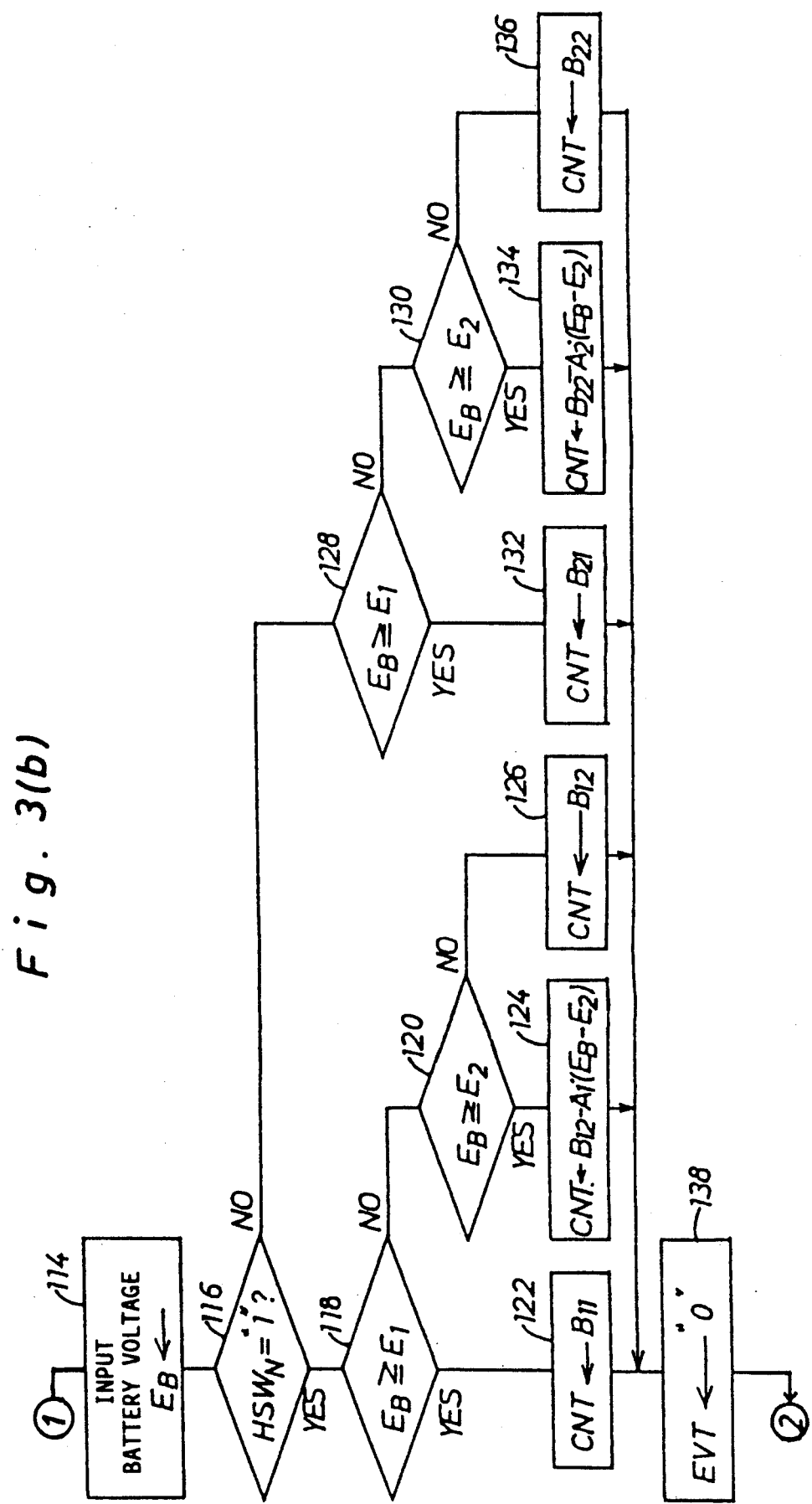
Figure 4:
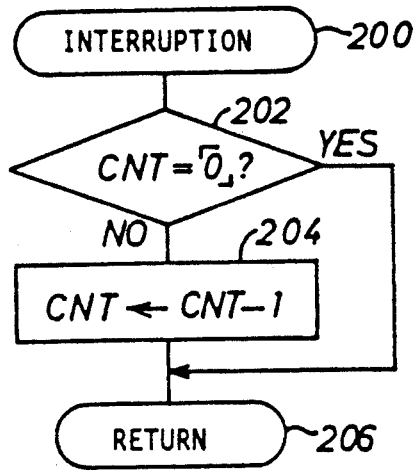
FIG. 4 is a flow chart of an interruption program executed by the computer.

Assuming that the ignition switch 51 has been closed in a condition where the wheel hub clutch mechanism 10 is in a disengaged condition, the computer 50 is applied with the source voltage from battery 52, and in turn, CPU 50c initiates execution of the main program at step 100 shown in FIG. 3(a). At the following step 102, CPU 50c sets a data indicative of the condition of changeover switch 54 as a new condition data $HSW_N$ and sets a count value CNT for control of power supply time as "0". At this step, CPU 50c further sets an event flag EVT as "1". In this instance, the new condition data $HSW_N$ is set as "1" when the changeover switch 54 is retained in its closed position. When the changeover switch 54 is maintained in its open position, the new condition data $HSW_N$ is set as "0". The count value CNT is adapted to define an optimal activation time of the electric motor 32. At an initial stage for control of the activation time, the count value CNT is set as a positive value to be reduced by "1" to "0" in accordance with lapse of time, as will be described in detail later. The event flag EVT is set as "1" when the changeover switch 54 is operated by the driver.

After processing at step 102, CPU 50c renews an old condition data $HSW_O$ with the new condition data $HSW_N$ at step 104 and reads out the position of changeover switch 54 at step 106 to set again the new condition data $HSW_N$. At the following step 108, CPU 50c determines as to whether or not the new condition data $HSW_N$ coincides with the old condition data $HSW_O$. As the changeover switch 54 is still maintained in its open position, CPU 50c determines a "Yes" answer at step 108 and causes the program to proceed to step 112 where CPU 50c determines as to whether the event flag EVT is "1" or not. If the answer is "Yes" at step 112, the program proceeds to step 114 where CPU 50c reads out a voltage value indicative of the instant voltage applied to the electric motor 32 from the voltage detection circuit 53 and sets the voltage value as a battery voltage $E_B$. At step 116, CPU 50c determines as to whether the new condition data $HSW_N$ is "1" or not.

Figure 5:
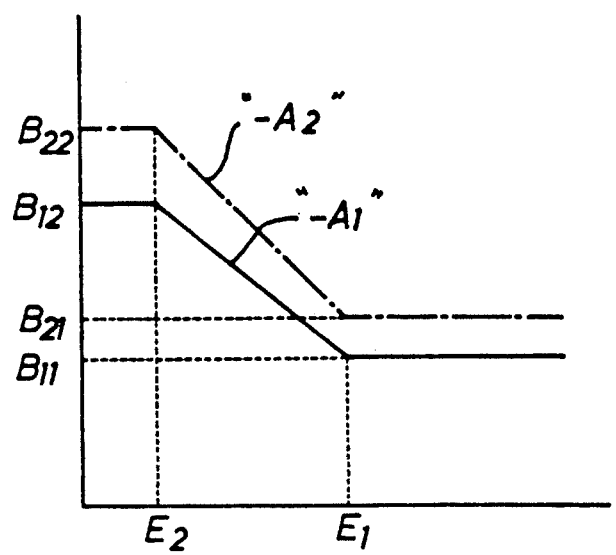
FIG. 5 is a graph showing a relationship between a battery voltage and a power supply time.

When the changeover switch 54 is retained in its closed position, the new condition data $HSW_N$ is determined as "1". Thus, CPU 50c determines a "Yes" answer at step 116 and causes the program to proceed to step 118. At this step, CPU 50c will set the count value CNT as an optimal value in accordance with the battery voltage $E_B$ at steps 118 to 126 as follows:

1) When the battery voltage $E_B$ is more than a first reference value $E_1$ as shown in FIG. 5, CPU 50c determines a "Yes" answer at step 118 and sets the count value CNT as a time value $B_{11}$ at step 122.

2) When the battery voltage $E_B$ is less than the first reference value $E_1$ and more than a second reference value $E_2$, CPU 50c determines a "No" answer at step 118 and a "Yes" answer at step 120 and sets the count value CNT as a time value $B_{12} - A_1(E_B - E_2)$ at step 124.

3) When the battery volta $E_B$ is less than the second reference value $E_2$, CPU 50c determines a "No" answer respectively at steps 118 and 120 and sets the count value CNT as a time value $B_{12}$ at step 126.

The first reference value $E_1$ represents an optimal voltage for activation of the electric motor 32, and the time value $B_{11}$ represents a power supply time during which the electric motor 32 is activated under the optimal voltage $E_1$ to cause full engagement of the clutch mechanism 10. The second reference value $E_2$ represents a lower limit voltage for activation of the electric motor 32, and the time value $B_{12}$ represents a power supply time during which the electric motor 32 is activated under the lower limit voltage $E_2$ to cause full engagement of the clutch mechanism 10. In addition, the value of "$-A_1$" represents an inclination of the solid line shown in FIG.

After processing at steps 122 to 126, CPU 50c sets the event flag EVT as "0" at step 138 and causes the program to proceed to step 140. Since the count value CNT is being set as a larger value than "0" and the new condition data $HSW_N$ is being set as "1", CPU 50c determines a "No" answer at step 140 and a "Yes" answer at step 142 and causes the program to proceed to step 46. Thus, CPU 50c produces a control data for rotating the electric motor 32 in the forward direction and applies it to the output interface 50g. When applied with the control data from CPU 50c through the output interface 50g, the transistor $Tr_1$ is turned on while the transistor $Tr_2$ is turned off. As a result, the relay coil 55a is energized to switch over the relay switch 55b from the first position to the second position, while the relay coil 56a is maintained in its deenergized condition to retain the relay switch 56b in the first position. In turn, the electric motor 32 is supplied with a drive current flowing in a direction shown by an arrow in FIG. 2. In this instance, the electric motor 32 does not rotate if the wheel hub clutch mechanism 10 is in an engaged condition. Only when the changeover switch 54 has been closed in a condition where the clutch mechanism 10 is in a disengaged condition, the electric motor 32 is activated by the drive current to rotate in the forward direction. The forward rotation of electric motor 32 causes the cam rotor 35 to rotate in the forward direction, and in turn, the cam follower 37 cooperates with the cam rotor 35 under the load of coil spring 41 to bring the outer clutch member 36 into engagement with the inner clutch member 31.

After processing at step 146, the program returns to step 104, and in turn, the execution at steps 104 to 108, 112, 140, 142 and 146 is repeated until the count value CNT becomes "0". During such execution, the timer circuit 50e produces an interruption signal therefrom at a predetermined time interval. When applied with the interruption signal, CPU 50c ceases the execution of the main program and initiates execution of the interruption program at step 200 shown in FIG. 4(b). Thus, CPU 50c successively subtracts "1" from the count value CNT by processing at steps 202 to 206. When the count value CNT becomes "0", CPU 50c determines a "Yes" answer at step 140 of the main program and produces a control data for deactivating the electric motor 32 at step 144. When applied with the control data from CPU 50c through the output interface 50g, the transistor $Tr_1$ is turned off and maintained in its off-position while the transistor $Tr_2$ is maintained in its off-position. Thus, the relay coil 55a is deenergized to switch over the relay switch 55b from the second position to the first position, and in turn, the power supply to the electric motor 32 is released.

When the battery voltage $E_B$ is more than the second reference value $E_2$ during the execution described above, the count value CNT is set to represent an optimal power supply time necessary for full engagement of the clutch mechanism 10. When the battery voltage $E_B$ is less than the second reference value $E_2$, full engagement of the clutch mechanism 10 may not be ensured. In such a situation, a warning lamp (not show) is lighted to inform the driver of drop of the battery voltage $E_B$.

If the new condition data $HSW_N$ is "0" at step 116 in a condition where the changeover switch 54 is in its open position, CPU 50c determines a "No" answer to conduct the following execution at steps 128 to 136 thereby to set the count value CNT as an optimal value in accordance with the battery voltage $E_B$ as shown by a dot and dash line in FIG. 5. When the battery voltage $E_B$ is more than the first reference value $E_1$, CPU 50c determines a "Yes" answer at step 128 and sets the count value CNT as a time value $B_{21}$ at step 132. When the battery voltage $E_B$ is less than the first reference value $E_1$ and more than the second reference value $E_2$, CPU 50c determines a "No" answer at step 128 and a "Yes" answer at step 130 and sets the count value CNT as a time value $B_{22} - A_2(E_B - E_2)$. When the battery voltage $E_B$ is less than the second reference value $E_2$, CPU 50c determines a "No" answer respectively at steps 128 and 130 and sets the count value CNT as $B_{22}$ at step 136.

The time value $B_{21}$ represents a power supply time during which the electric motor 32 is activated to cause full disengagement of the clutch mechanism 10. Since the outer clutch member 36 is loaded by frictional engagement with the inner clutch member 31 when the clutch mechanism 10 is in its engaged condition, the time value $B_{21}$ is determined to be larger than the time value $B_{11}$. The time value $B_{22}$ represents a power supply time during which the electric motor 32 is activated under the voltage $E_2$ to cause full disengagement of the clutch mechanism 10. Due to the load acting on the outer clutch member 36, the time value $B_{22}$ is determined to be larger than the time value $B_{21}$. In addition, the valve of "$-A_2$" represents an inclination of the dot and dash line in FIG. 5.

When the event flag EVT is set as "0" at step 138 after processing at steps 132 to 136, the program proceeds to steps 140 and 142. As the count value CNT is being set as a larger value than "0" and the new condition data $HSW_N$ is being set as "0", CPU 50c determines a "No" answer respectively at steps 140 and 42 and causes the program to proceed to step 148. Thus, CPU 50c produces a control data for rotating the electric motor 32 in the reverse direction and applies it to the output interface 50g. When applied with the control data through the output interface 50g, the transistor $Tr_2$ is turned on while the transistor $Tr_1$ is maintained in its off-position. As a result, the relay coil 55a is maintained in its deenergized condition to retain the relay switch 55b in the first position, while the relay coil 56a is energized to switch over the relay switch 56b from the first position to the second position. Thus, the electric motor 32 is supplied with the drive current flowing in the reverse direction.

If the clutch mechanism 10 is in a disengaged condition during the execution described above, the electric motor 32 does not rotate. When applied with the reverse drive current in a condition where the clutch mechanism 10 is being engaged, the electric motor 32 starts to rotate in the reverse direction, and in turn, the cam rotor 35 rotates in the reverse direction to cooperate with the cam follower 37 thereby to disengage the outer clutch member 36 from the inner clutch member 31 against the biasing force of spring 41.

After processing at step 148, the execution at steps 104 to 108, 112, 140, 142 and 148 is repeated until the count value CNT becomes "0". When the count value CNT becomes "0", CPU 50c determines a "Yes" answer at step 140 and causes the program to proceed to step 144. Thus, the power supply to electric motor 32 is released. When the battery voltage $E_B$ is higher than the second reference value $E_2$ during the execution described above, the outer clutch member 36 is fully disengaged from the inner clutch member 31. When the battery voltage $E_B$ is lower than the second reference value $E_2$, the warning lamp (not shown) is lighted to inform the driver of drop of the battery voltage $E_B$.

From the above description, it will be understood that under the initial control the condition of clutch mechanism 10 coincides with the condition of changeover switch 54 immediately after the ignition switch 51 has been closed.

USUAL CONTROL

After the initial control described above, the main and interruption programs will be repeatedly executed by CPU 50c. If the changeover switch 54 is not switched over during execution of the main program, the new condition data $HSW_N$ will be the same as the old condition data $HSW_O$, and the event flag EVT and count value CNT will be maintained as "0", respectively. Thus, the execution at steps 104 to 108, 112, 140 and 144 will be repeated. Assuming that the changeover switch 54 has been closed in a condition where the wheel hub clutch mechanism 10 is maintained in a disengaged condition, CPU 50c sets the new condition data $HSW_N$ as "1" at step 106 and determines a "No" answer at step 108. In turn, CPU 50c sets the event flag EVT as "1" at step 110 and determines a "Yes" answer at step 112. As a result, the execution at steps 114 to 126 is repeated by CPU 50c to set the count value CNT as an optimal time value in accordance with the battery voltage $E_B$, and the program proceeds to steps 140 and 142. In this instance, CPU 50c determines a "No" answer at step 140 and a "Yes" answer at step 142 until the count value CNT becomes "0". Thus, the electric motor 32 is activated during processing at step 146 to rotate in the forward direction thereby to fully engage the clutch mechanism 10. When the count value CNT becomes "0", CPU 50c determines a "Yes" answer at step 140 and causes the program to proceed to step 144. As a result, the electric motor 32 is deactivated by processing at step 144 in the same manner as described above.

Assuming that the changeover switch 54 has been opened in a condition where the clutch mechanism 10 is maintained in an engaged condition, the old condition data $HSW_O$ is maintained as "1" at step 104, and the new condition data $HSW_N$ is set as "0" at step 106. Thus, CPU 50c determines a "No" answer at step 108, sets the event flag EVT as "1" at step 110 and determines a "Yes" answer at step 112. This causes the program to proceed to step 116 through step 114. In this instance, CPU 50c determines a "No" answer at step 116 and sets the count value CNT as an optimal time value by execution at steps 128 to 136. After execution at steps 128 to 136, CPU 50c determines a "No" answer at steps 140 and 142 respectively until the count value CNT becomes "0". Thus, the electric motor 32 is activated during processing at step 148 to rotate in the reverse direction thereby to fully disengage the clutch mechanism 10. When the count value CNT becomes "0", CPU 50c determines a "Yes" answer at step 140 and causes the program to proceed to step 144. As a result, the electric motor 32 is deactivated by processing at step 144 in the same manner as described above. After the clutch mechanism 10 has been fully disengaged, CPU 50c will repeat execution at steps 104 to 108, 112,140 and 144.

As is understood from the above description, the count value CNT for control of the power supply time is set as a larger value when the clutch mechanism 10 is switched over from an engaged condition to a disengaged condition. This means that the electric motor 32 is activated for a long period of time defined by the count value CNT to fully disengage the outer clutch member 36 from the inner clutch member 31 against the frictional load acting thereon. The count value CNT is set as a smaller value when the clutch mechanism 10 is switched over from a disengaged condition to an engaged condition. This means that the electric motor 32 is activated for a short period of time defined by the count value CNT. As a result, unnecessary power supply to the electric motor 32 can be avoided. Furthermore, the count value CNT is set as a lager value in accordance with decrease of the battery voltage $E_B$ to prolong the activation time of electric motor 32. This is useful to ensure switchover operation of the clutch mechanism even when the battery voltage has fluctuated.

Although in the foregoing embodiment the count value CNT is set as an optimal value by processing at steps 118 to 136, the data of FIG. 5 may be memorized in ROM 50b in the form of a table to set the count value as an optimal value in accordance with the battery voltage $E_B$ and the new condition data $HSW_N$.

What is claimed is:

1. An electric control apparatus for a clutch mechanism provided therein with a reversible electric motor which is activated under control of a changeover switch to engage said clutch mechanism in its forward rotation and to disengage said clutch mechanism in its reverse rotation, comprising:

means for setting a first period of time when said changeover switch has been operated to engage said clutch mechanism, the first period of time representing a power supply time during which said electric motor is activated to cause full engagement of said clutch mechanism; and means for setting a second period of time when said changeover switch has been operated to disengage said clutch mechanism, the second period of time being defined to be longer than the first period of time and representing a power supply time during which said electric motor is activated to cause full disengagement of said clutch mechanism.

2. An electric control apparatus as claimed in claim 1, further comprising means for increasing the first and second periods of time respectively when the power source voltage applied to said electric motor has decreased below a predetermined level.

* * * * *